United States Patent
Dong et al.

(10) Patent No.: US 12,159,225 B2
(45) Date of Patent: Dec. 3, 2024

(54) QUEUE ALLOCATION IN MACHINE LEARNING ACCELERATORS

(71) Applicant: Google LLC, Mountain View, CA (US)

(72) Inventors: Xiangyu Dong, San Jose, CA (US); Kais Belgaied, San Jose, CA (US); Yazhou Zu, San Francisco, CA (US)

(73) Assignee: Google LLC, Mountain View, CA (US)

( * ) Notice: Subject to any disclaimer, the term of this patent is extended or adjusted under 35 U.S.C. 154(b) by 936 days.

(21) Appl. No.: 17/136,229

(22) Filed: Dec. 29, 2020

(65) Prior Publication Data

US 2022/0114440 A1 Apr. 14, 2022

Related U.S. Application Data

(60) Provisional application No. 63/091,708, filed on Oct. 14, 2020.

(51) Int. Cl.
*G06N 3/08* (2023.01)
*G06F 9/54* (2006.01)
*G06N 20/00* (2019.01)

(52) U.S. Cl.
CPC .............. *G06N 3/08* (2013.01); *G06F 9/544* (2013.01); *G06F 9/547* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,877,048 | B2 | 4/2005 | Bilak et al. |
| 7,444,491 | B1 | 10/2008 | Steinbusch |
| 8,797,877 | B1 | 8/2014 | Perla et al. |
| 9,710,265 | B1 | 7/2017 | Temam et al. |
| 10,540,588 | B2 | 1/2020 | Burger et al. |
| 2010/0165871 | A1 | 7/2010 | Sindhu et al. |
| 2020/0320375 | A1* | 10/2020 | Abuhatzera ............ G06N 3/045 |

FOREIGN PATENT DOCUMENTS

| | | | |
|---|---|---|---|
| CN | 103259747 | | 8/2013 |
| CN | 107005494 | | 8/2017 |
| CN | 109389214 | | 2/2019 |
| CN | 111767236 | | 10/2020 |
| EP | 1720295 | | 7/2009 |
| EP | 3343367 | A1 * | 7/2018 ............ G06F 9/455 |

(Continued)

OTHER PUBLICATIONS

Congdon et al., Simultaneously Reducing Latency and Power Consumption in OpenFlow Switches, IEEE/ACM Transactions on Networking, vol. 22, No. 3, Jun. 2014; pp. 1007-1020 (Year: 2014).*

(Continued)

*Primary Examiner* — Alan Chen
(74) *Attorney, Agent, or Firm* — Fish & Richardson P.C.

(57) ABSTRACT

This disclosure generally provides solutions for improving the performance of a custom-built, packet-switched, TPU accelerator-side communication network. Specifically a set of solutions to improve the flow-control behavior by tuning the packet buffer queues in the on-chip router in the distributed training supercomputer network are described.

19 Claims, 7 Drawing Sheets

(56) References Cited

FOREIGN PATENT DOCUMENTS

| EP | 3823168 A1 * | 5/2021 | ......... G06F 15/7839 |
|---|---|---|---|
| WO | WO 2015016640 | 2/2015 | |

OTHER PUBLICATIONS

ACM Digital Library [online], "In-Datacenter Performance Analysis of a Tensor Processing Unit," retrieved Dec. 31, 2020, retrieved from URL<https://dl.acm.org/doi/10.1145/3079856.3080246>, 12 pages.

cacm.acm.org [online], "A Domain-Specific Architecture for Deep Neural Networks," retrieved Dec. 31, 2020, retrieved from URL<https://cacm.acm.org/magazines/2018/9/230571-a-domain-specific-architecture-for-deep-neural-networks/fulltext>, 13 pages.

Cloud.Google.com [online], "Google breaks AI performance records in MLPerf with world's fastest training supercomputer," retrieved Dec. 31, 2020, retrieved from URL<https://cloud.google.com/blog/products/ai-machine-learning/google-breaks-ai-performance-records-in-mlperf-with-worlds-fastest-training-supercomputer>, 1 page.

Habana.ai [online], "Gaudi Training Platform White Paper," retrieved Dec. 31, 2020, retrieved from URL<https://habana.ai/wp-content/uploads/2019/06/Habana-Gaudi-Training-Platform-whitepaper.pdf>, 25 pages.

Huawei.com [online], "Ascend 910 AI Processor High-performance AI processor for training," retrieved Dec. 31, 2020, retrieved from URL<https://e.huawei.com/us/products/cloud-computing-dc/atlas/ascend-910>, 3 pages.

Huawei.com [online], "Huawei launches Ascend 910, the world's most powerful AI processor, and MindSpore, an all-scenario AI computing framework," retrieved Dec. 31, 2020, retrieved from URL<https://www.huawei.com/us/news/2019/8/huawei-ascend-910-most-powerful-ai-processor>, 7 pages.

Lepikhin et al., "GShard: Scaling Giant Models with Conditional Computation and Automatic Sharding," arXiv preprint arXiv:2006.16668, Jun. 2020, 35 pages.

Mlperf.org [online], "MLPerf Training v0.7 Results," retrieved Dec. 31, 2020, retrieved from URL<https://mlperf.org/training-results-0-7/>, 4 pages.

Mpitutorial.com [online], "MPI Reduce and Allreduce," retrieved Dec. 31, 2020, retrieved from URL<https://mpitutorial.com/tutorials/mpi-reduce-and-allreduce/>, 7 pages.

Nvidia.com [online], "Nvlink & Nvswitch," retrieved Dec. 31, 2020, retrieved from URL<https://www.nvidia.com/en-us/data-center/nvlink/>, 7 pages.

International Preliminary Report on Patentability in International Appln No. PCT/US2021/054474, mailed on Apr. 27, 2023, 14 pages.

PCT International Search Report and Written Opinion in International Appln No. PCT/US2021/054474, dated Jan. 20, 2022, 19 pages.

Hao et al., "Comparison of Buffer Allocation Strategies in Shared Buffer ATM Switches under VBR Traffic" Journal of Beijing University of Posts and Telecommunications, vol. 22. No. 2, Jun. 1999, 5 pages (with English abstract).

Office Action in Chinese Appln. No. 202180019645.8, mailed on Oct. 26, 2023, 29 pages (with English translation).

Office Action in Chinese Appln. No. 202180019645.8, mailed on May 28, 2024, 24 pages (with English translation).

Office Action in European Appln. No. 21802134.3, mailed on Jul. 5, 2024, 7 pages.

Office Action in Korean Appln. No. 10-2022-7030949, mailed on Oct. 15, 2024, 11 pages (with English translation).

\* cited by examiner

QUEUE ALLOCATION IN MACHINE LEARNING ACCELERATORS

CLAIM OF PRIORITY

This application claims the benefit of priority under 35 U.S.C. § 119(e) to U.S. Provisional Application No. 63/091,708, filed Oct. 14, 2020, the contents of which are incorporated by reference herein.

TECHNICAL FIELD

The present disclosure relates to allocation of shared memory for traffic queuing in a machine learning accelerator communications network

BACKGROUND

Electronic devices can be composed of multiple different compute units which need to communicate data amongst themselves in order for the electronic device to operate. Data communications between compute units may be nondeterministic. For example, data communications are subject to variable latencies between the transmission time at one unit to the reception time at another unit. That is, the time it takes for data to travel from one unit to another is not constant, but subject to many different sources of variance in transmission time.

SUMMARY

In general, the disclosure involves a method for memory allocation in a machine learning accelerator communications network. In general the method includes accessing metadata associated with a plurality of communications ports of an application specific integrated circuit (ASIC). The metadata identifies, for each port, whether the particular port is used in the current configuration and a communications medium associated with the particular port. An expected latency is determined for each port based on the metadata and portions of a shared memory are allocated to each port. The shared memory is allocated by assigning a zero memory for ports that are not used, determining a memory allocation for each port based on the expected latency and assigning a start address and a stop address of the shared memory to each port. Implementations can optionally include one or more of the following features.

In some implementations, assigning the start address and stop address of the shared memory to each port includes invoking an application programming interface (API) by a device different from the ASIC.

In some implementations, a process is executed on the ASIC using the machine learning accelerator communications network and allocated shared memory. In some implementations the process is training a neural network.

In some implementations the ASIC is a tensor processing unit (TPU).

In some implementations, the communications medium identified in the metadata is a copper cable medium, an optical medium, a printed circuit board (PCB) medium, or any combination thereof.

In some implementations, the memory is allocated according to the equation:

$$\text{Queue Size}(p) = \frac{latency_p}{(N-1) * \sum latency_i} * \text{Total Size}$$

In an alternative implementation, a method for memory allocation in a machine learning accelerator communication network includes determining a network topology for a network of machine learning accelerator ASICs. Metadata associated with a plurality of communications ports of each ASIC within the network is accessed. The metadata identifies, for each port of the plurality of ports, whether a particular port is used in the current configuration and a communications medium associated with the particular port. A round-trip-time (RTT) delay is determined for each port used in the network topology. Portions of the shared memory are allocated to each port of the plurality of ports by: determining a memory allocation for each port proportional to the RTT delay and assigning a start address and a stop address of the shared memory to each port for the determined memory allocation. A process is executed on the machine learning accelerator which sends profiling traffic into the network for a predetermined duration. For each port, a number of received traffic packets is determined, and portions of the shared memory are reallocated to each port of the plurality of ports by: determining a memory allocation for each port proportional to the received packet count and the start address and stop address is reassigned for each port of the determined memory allocation.

In some implementations, assigning and reassigning the start address and the stop address of the shared memory to each port includes invoking an API by a device different from the ASIC In some implementations, memory allocation proportional to the determined RTT delay for each port is determined according to the equation:

$$\text{Queue Size}(p) = \frac{latency_p}{(N-1) * \sum latency_i} * \text{Total Size.}$$

In some implementations, memory allocation proportional to the received packet count for each port is determined according to the equation:

$$\text{Queue Size}(p) = \frac{packet\_num_p}{(N-1) * \sum packet\_num_i} * \text{Total Size.}$$

In some implementations, the RTT delay is calculated prior to execution by transmitting and receiving one or more timing messages to determine latency.

In some implementations, the profiling traffic includes all-to-all traffic, nearest-neighbor traffic, a synthetic traffic profile, or any suitable combination thereof.

In an alternate implementation, a method for allocating memory for a machine learning accelerator communication network includes determining a network topology for a network of machine learning accelerator application specific integrated circuits (ASICs). Metadata associated with a plurality of communications ports of each ASIC within the network is accessed. The metadata identifies, for each port of the plurality of ports, whether a particular port is used in the current architecture and a communications medium associated with the particular port. The metadata identifies, for each port of the plurality of ports, whether a particular port is used in the current configuration and a communications medium associated with the particular port. A round-trip-time (RTT) delay is determined for each port used in the network topology. Portions of the shared memory are allocated to each port of the plurality of ports by: determining a memory allocation for each port proportional to the RTT delay and assigning a start address and a stop address of the shared memory to each port for the determined memory allocation. A process is executed on the ASIC, the process using the machine learning accelerator communications network with the allocated shared memory. During execution of the process a number of message packets received at each port of the plurality of ports over a first time period is determined. A desired portion size of the shared memory for each port of the plurality of ports is determined based on the number of message packets received at each port. The process is paused for a second time period and it is determined whether the shared memory is clear of pending message packets. When the shared memory is clear, the start address and stop addresses of the shared memory for each port are reassigned according to the desired portion size, and execution of the process is resumed.

The various implementations provide one or more of the following advantages. For example, in some implementations, the machine learning hardware accelerator can execute faster and avoid bottlenecks in the accelerator's on board communications network, by more efficiently allocating message buffer queues.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
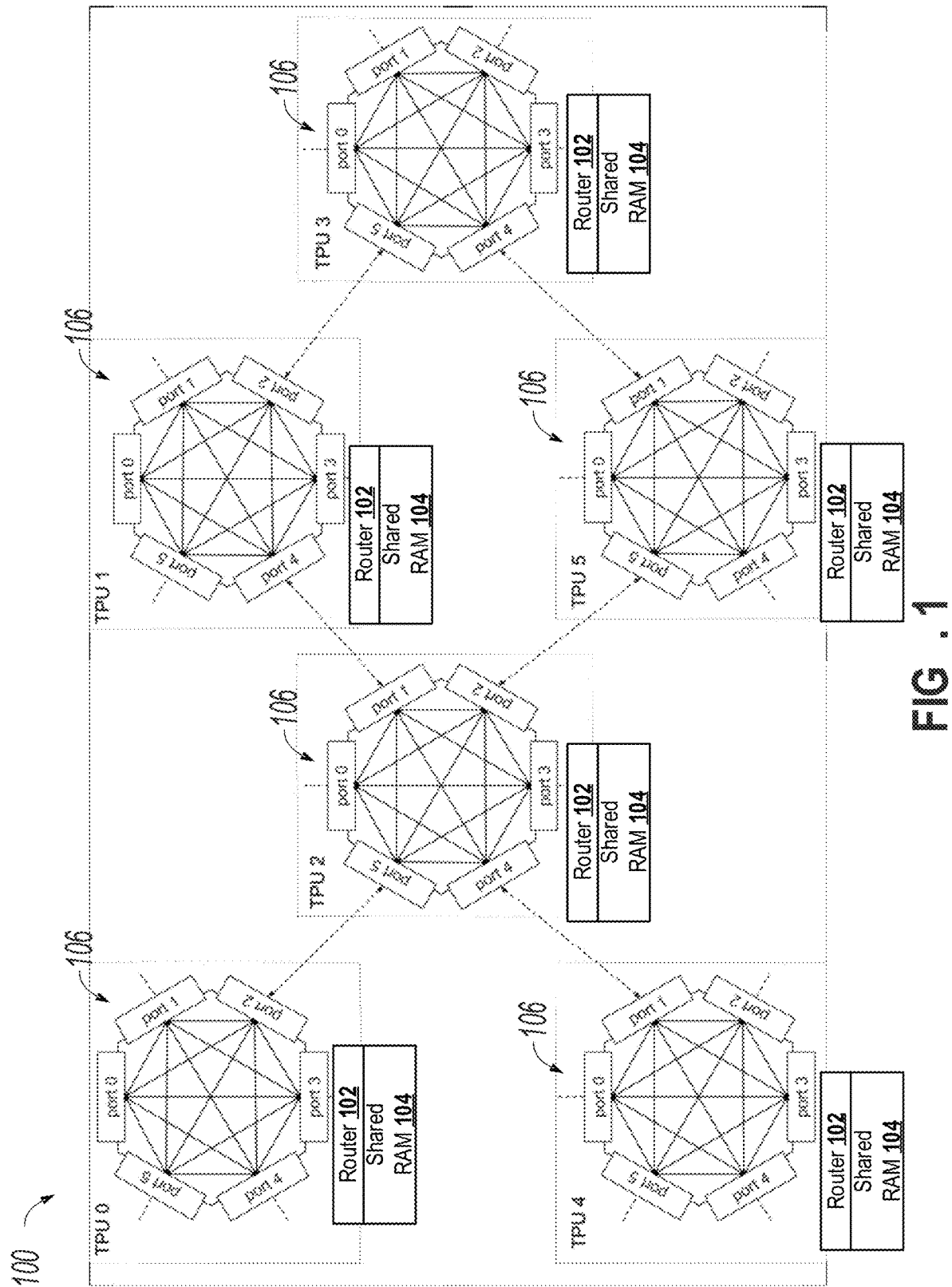
FIG. 1 is a schematic diagram that illustrates an example machine learning accelerator in accordance with implementations of the present disclosure.

In general, the disclosure relates to allocating a shared memory between different channels of communication or ports in a high speed communication network, e.g., a communication network of a machine learning accelerator that includes multiple application specific integrated circuits (ASICs). Deep learning training necessitates distributed, parallel processing. The distribution can either partition the large amounts of training data into different replications (replica), (e.g. data parallelism), or partition a very large model into smaller modules, (e.g., model parallelism). The partitioned training data and model parameters are put onto different processing units to compute concurrently.

Distributed training happens in a synchronous, iterative, and incremental loop. Under data parallelism, each processing unit ingests a mini-batch of data at each step, computes the local gradients, and then exchanges all local gradients throughout the network of compute units in an all-reduce manner to compute a final, globally consistent gradient, with which model weights are updated at the end of a step.

Under model parallelism, each processing unit takes model activation input from its local training data, or from the output of another processing unit that operates on hidden layers before itself. The processing unit then computes the activation output, which can either be a final model output, or serve as the activation input of another processing unit. The gradient is computed on the processing unit that includes the final layer, and gets sent back to the previous layers to update the partitioned submodels. This process can be pipelined to operate on successive mini-batches. Under this approach, intermediate activation output is sent around the network, as well as the gradients at the model partitioning boundaries.

In practice, data and model parallelism can be combined to achieve the highest performance. For example models with hundreds of billions of weight parameters, a huge amount of compute resources and communications are needed to converge the model to the level of accuracy required.

To speed up the training process, ASICs such as the custom-built accelerator chip the Tensor Processing Unit (TPU) are designed to serve as processing units in order to speed up deep learning compute. In some implementations, chip types are used (e.g., FPGAs, GPGPUs, or CPUs). Meanwhile, a co-designed inter-accelerator high-speed communication network is also built to speed up the inter-processing unit communication. Altogether, the training system can provide exaFLOP-level compute performance, equivalent to a state-of-the-art supercomputer.

The TPU accelerator's custom-built network is designed for simplicity in order to reduce the network processing overhead. With the fundamental features of an interconnected network complete, such as addressing, error detection and correction, routing and flow control, the bulk of network processing is carried over on the accelerator chip hardware to speed up processing.

This disclosure focuses on improving the performance of a custom-built, packet-switched, TPU accelerator-side communication network. Specifically a set of solutions to improve the flow-control behavior by tuning the packet buffer queues in the on-chip router in the distributed training supercomputer network are proposed.

The solutions disclosed herein apply to the synchronous data-parallel and model-parallel training pattern discussed above, and can also apply to asynchronous, distributed training in an accelerator network in general.

FIG. 1 is a schematic that illustrates an example machine learning accelerator 100 in accordance with implementations of the present disclosure. Illustrated in this example is a TPU network interconnected through an on-chip network stack processing hardware module. In this example, each TPU 106 has six network ports, which are linked to each other through buffer queues to form a within-chip crossbar. In some implementations, each TPU 106 can have more than, or less than six ports (e.g., ten, three, or other number). In some implementations, the link between ports can be further divided into multiple virtual channels of communications. Additionally, which ports are connected can be determined at the software level, prior to execution of a job within the TPU network. For example, FIG. 1 illustrates a number of TPUs 106 in a two dimensional configuration, however it is possible to have a three dimensional (e.g., spherical) configuration, or other geometry based on the connections between TPU ports.

The TPU's 106 accelerator-side network stack is implemented in an on-chip hardware processing module or router 102 on each TPU 106. Communication during distributed training is formatted as multiple network packets. In operation, a packet between a pair of source and destination TPU chips is hopped over one or more TPU chips as intermediate steps before reaching the final destination. At each TPU chip hop, the on-chip network stack interfaces with the chip's various network ports, and forwards packets received from one port to another port, as instructed by a user-specified routing algorithm. The port-to-port transmit within a chip is carried over in a buffer queue. The cross-connected buffer queues within a chip forms a crossbar for fast chip-level network processing.

Flow control can be enforced between every pair of directly connected TPUs 106 in the super computer network or machine learning accelerator 100, e.g., to prevent a faster sender TPU 106 accelerator from overwhelming a slower receiver TPU 106 accelerator. When a TPU network starts to forward the activation output and weight gradient traffic across different accelerators, the buffer queues in each chip's on-chip network stack constantly inputs packets from an input port to an output port, and the utilization of the buffer space changes dynamically, depending on the traffic ingress and egress rate at the TPU chip 106. When the buffer queue corresponding to a port is fully utilized, no packet can be received at that port as there is no buffer space left, and the upstream TPU accelerator should stop sending messages. The sender is regulated by opportunistically sending flow-control messages that tell a sender the amount of buffer queue space available at a receiver port, denoted as the "credits" hereafter. The sender should not emit any message larger than the available credit it receives. In some implementations, the link between any two connected TPU accelerators 106 is bi-directional, and credit messages are sent bi-directionally as well.

The TPU accelerator-side communication network can be a heterogeneous network environment. In other words, communication time between ports may vary from port to port and TPU 106 to TPU 106. Additionally, the amount of traffic distributed across the ports may not be uniform, and therefore intelligent and dynamic message queuing can significantly enhance communications in the TPU communication network.

This heterogeneousness can be caused by several different factors. For example, for a large-scale deep learning training supercomputer that scales to thousands of TPU accelerators 106, a variety of link mediums may be used to wire up the entire network. Example mediums used in links include, but are not limited to, PCB traces which are leveraged for TPU accelerators 106 soldered on the same tray to exchange data, copper cables which are used for lower-cost, short-range communication, and optical cables are used for long-range communication. The different medium materials present heterogeneous link performance in terms of throughput and capacity, which affects the queue utilization in a router.

Additionally, the large-scale supercomputer network inevitably involves links with different lengths. The thousands of TPU accelerators 106 span multiple racks at the very least, leading to intra-rack cables that have shorter distance and lower latency, and inter-rack cables that have longer distance, longer latency and greater variance between different links. The latency affects buffer queues' utilization. These cable links have various quality levels after periods of usage, measured by bit-error-rate (BER). The varying BER renders the packet transmission retry behavior to be different among all the links, leading to heterogeneous link pressure, and queue saturation rate.

The TPUs' network ports are often not used uniformly, depending on the topology of the distributed training job. For instance, if a user training job requests TPU resources in a 2D mesh topology among all that is available in the supercomputer, then the TPUs on the edge of the mesh do not use all the ports—the ports not facing inwards in the mesh are connected to a neighboring accelerator but receives no traffic, as compared to the other actively transmitting ports.

The large-scale supercomputer network can inherently provide fault tolerance by routing around a faulty chip, a faulty host, or a fault inter-TPU link medium. The fault-tolerant routing can make link traffic pressure unbalanced even though the fault-free topology is originally an isomorphic one. A TPU 106 whose ports are all actively used and connected to medium with the same type, distance, and quality may undergo highly heterogeneous traffic because some ports are on a more critical route to go around the fault site. Furthermore, accelerators neighboring to the fault site exacerbate the imbalance usage of ports, where ports directly connected to a fault chip, or fault link receives no traffic.

The distributed training approach introduces heterogeneity by itself. Although in the data-parallel model all TPUs 106 exchange the same amount of local gradients with each other, more advanced techniques like model partitioning and model parallelism makes the gradient and activation output exchanged over the network inherently heterogeneous across partitioning boundaries. The communication latency, not throughput, also becomes more important in model parallelism, as the inference on a partitioned model often depends on the output from another partition. In addition, reinforcement learning training also makes the TPU network traffic heterogeneous, where a group TPU workers 106 as agents that perform inference, and another group of TPU workers 106 perform the classical iterative training loop. The traffic inside and between these groups are inherently different. Therefore, dynamic queue allocation to address this heterogeneousness is desirable.

Each TPU 106, in addition to a plurality of communication ports, channels, and an on-chip hardware processing module (router 102), includes a shared programmable buffer queue storage structure 104. The buffer queue for each port can be software controlled to a different depth, and is stored in a shared Random Access Memory (RAM), for example, static RAM (SRAM) or dynamic RAM (DRAM). In some implementations, each port of the TPU 106 is assigned a start address and an end address in the shared RAM 104 to specify that particular port's queue region within the shared memory space.

The sizing of the buffer queues associated with a TPU accelerator's 106 various network ports is critical in tuning the overall training communication throughput. For a given link that undergoes a high amount of traffic, allocating too little buffer queue space for the port at the receiver TPU 106 will lead to the sender TPU 106 frequently halting its packet issue, slowing down the traffic, and possibly becoming the bottleneck of synchronous training communication. Each queue may be further divided into several virtual channels for a per-channel queue allocation. All queues correspond to a unidirectional link between two accelerators, although the interconnect link is bidirectional.

Figure 2:
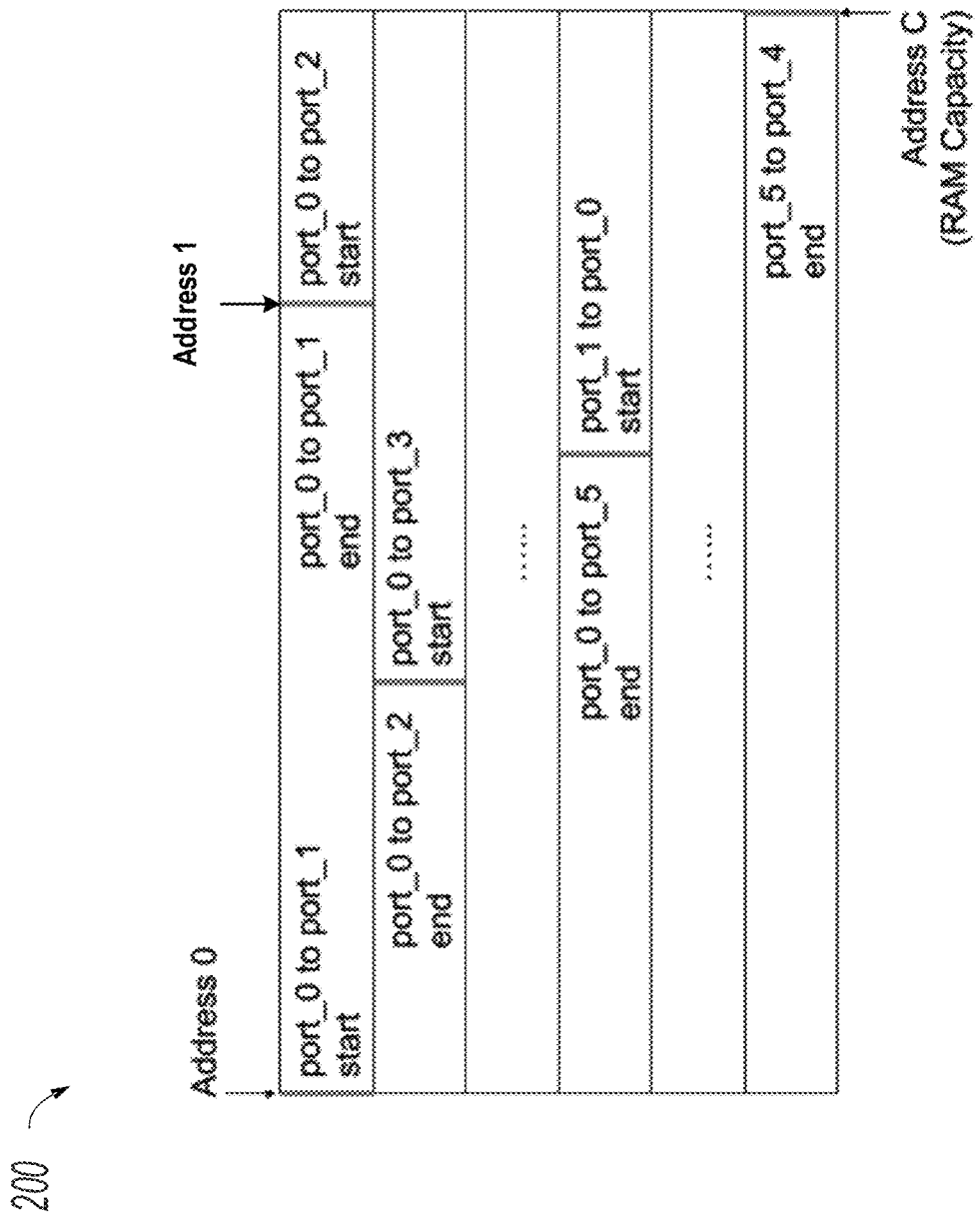
FIG. 2 is a diagram illustrating an example shared memory with buffer queues allocated for port to port traffic.

FIG. 2 illustrates an example shared memory 200 with buffer queues allocated for port to port traffic. Traffic in the buffer queues can be egress-to-port traffic, (e.g. traffic that is produced from the TPU and is outbound to a different TPU), port-to-ingress traffic (e.g., traffic that was produced external to a particular TPU and is to be ingested by the particular TPU), or port-to-port traffic (e.g., traffic passing through a TPU in the TPU network). Further, each port may be subdivided into multiple virtual channels, each providing a unique communications path. While FIG. 2 depicts only port-to-port queues allocated in the shared memory, all three types of traffic, or any suitable combination thereof can be present and are within the scope of this disclosure. In the illustrated example, each queue's FIFO (First In, First Out) pointer uses its start and end address as a reference for pushing and popping data from the queue. The port-to-ingress queue and egress-to-port queue follow the same addressing scheme, with a smaller number of queues to share the RAM capacity. The same mechanism applies to accelerators with more ports or fewer ports than illustrated.

These start and stop addresses (e.g., address 0 and address 1 as illustrated) can be controlled or assigned via software. A set of application programming interfaces (APIs) is exposed through the TPU accelerator's device driver to write to the PCIe config space registers that specify the size of each buffer queue. The APIs convert the queue sizes to each queue's start and ending address for hardware operation. The disclosed solution can invoke these APIs to dynamically configure and allocate the queue sizes for all ports in the TPU communication network.

Figure 3:
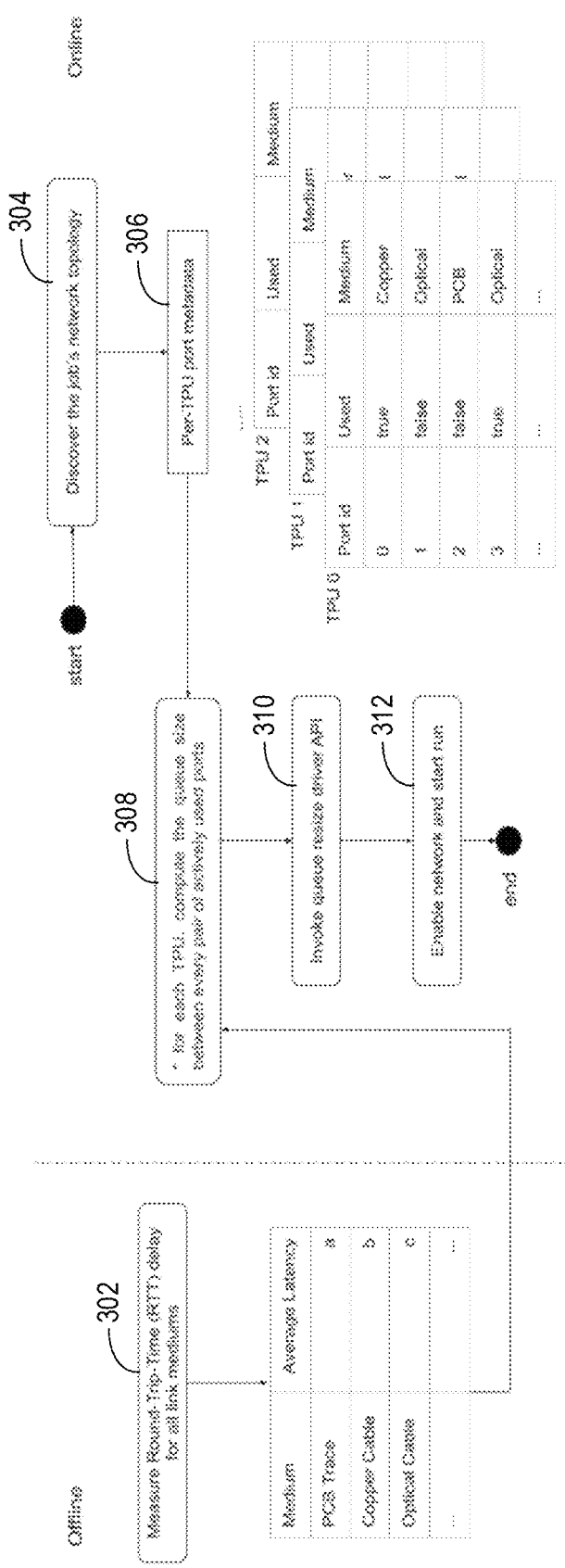
FIG. 3 is a flowchart of an example process for allocating shared memory based on anticipated latency in accordance with implementations of the present disclosure.

FIG. 3 is a flowchart of an example process for allocating shared memory based on anticipated latency in accordance with implementations of the present disclosure. The buffer queue allocation process inspects the ports that are actively used in a (sub)network that participates in the training process, and allocates the queue size (credits) by the weight of each port's upstream round-trip latency. This scheme takes into account the heterogeneity of link mediums, inactive ports in non-isomorphic networks, as well as inactive ports that are directly connected to a faulty link or a faulty TPU accelerator chip. The scheme is divided into two steps: offline link calibration and online credit allocation During offline link calibration, the average round-trip time (RTT) for different link mediums used in the TPU communications network are determined (302). This can be determined based on historical values, ping operations, or other methods, and provides a general expected latency for a given link based on the medium of that link. For example, a PCT trace might have a lower expected latency than an optical cable.

During the online credit allocation phase, a topology discovery can be performed to determine a network topology of the TPU communications network required or requested for a particular job to be executed (304). The topology discovery can identify which TPUs will be participating in an upcoming job, and which ports will be available in each TPU.

After the network topology is determined metadata can be accessed which provides information regarding the communications ports to be used in the TPU communications network for the job (306). For example each TPU may retain in an on-chip memory metadata identifying a port ID for each port, whether or not the port is in use in the current topology, a medium associated with each port (e.g., copper, optical, PCB, etc.), and a cable length associated with the port, among other things.

The accessed metadata in combination with the expected latency determined during offline calibration can be used to determine an expected, or anticipated RTT delay for each port, which can then be used to allocate queue buffers in the shared memory for each port according to the anticipated RTT delay or latency (308). A queue size is calculated for each port in each TPU by the TPU itself. The TPU initially assigns a queue size of zero to any unused ports, then assigns the remaining queue size for each port. In some implementations, the queue size calculation process happens independently and concurrently for all TPUs for the pending job in the TPU communication network. It indexes into the link latency table calibrated offline, and computes each port's queue size in proportion to the input port's round-trip time. In some implementations, queue size is calculated via the following equation where p is the port being calculated, and N is the total number of actively used ports at a chip:

$$\text{Queue Size}(p) = \frac{latency_p}{(N-1) * \sum latency_i} * \text{Total Size}$$

Once a queue size for each port and channel is determined, a start address and end address of the shared memory can be assigned for each port according to the size allocation (310). In some implementations this is accomplished using one or more APIs provided by the TPU architecture. For example, the APIs can write to the PCIe config space registers that specify the size of each buffer queue. The APIs convert the queue sizes to each queue's start and ending address for hardware operation. The disclosed solution can invoke these APIs to dynamically configure and allocate the queue sizes for all ports in the TPU communication network.

Upon completion of assigning addresses to the shared memory, the TPU communication network can be enabled, and an inference process, or training run can begin (312). The inference process can be a long running process intended to train, or weight a neural network for future machine learning outputs.

Figure 4:
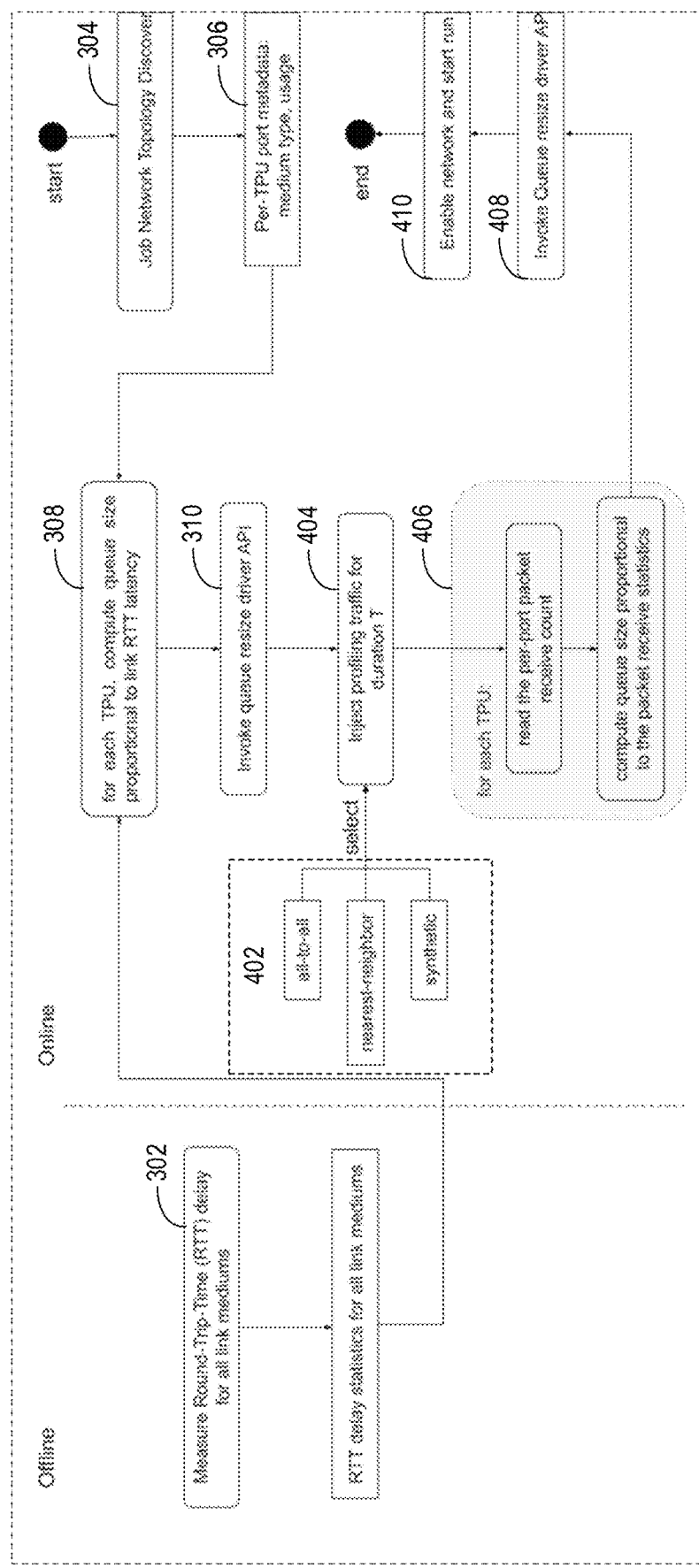
FIG. 4 is a flowchart of an example process for allocating shared memory based on a profiling traffic run in accordance with implementations of the present disclosure.

FIG. 4 is a flowchart of an example process for allocating shared memory based on a profiling traffic run in accordance with implementations of the present disclosure. By executing a profiling traffic run, a more authentic representation of traffic demand during job execution can be determined. In some implementations, the process for allocating shared memory based on a profiling traffic run begins by completing the process as described with respect to FIG. 3 (e.g., 302-310), and traffic queues are given an initial allocation.

Once the initial buffer queues are assigned, one or more message traffic profiles can be selected for a profiling run on the network (402). Example profiles can include, but are not limited to all-to-all, nearest-neighbor traffic, or another synthetic pattern generated by a machine learning model (e.g., a model-partitioned ResNet-50 or bidirectional encoder representation from transformer (BERT) model). In some implementations, all, or a combination of, the previous traffic profiles are combined for the profiling run. Prior to beginning the profiling run, software clears a hardware performance counter register in each TPU, effectively resetting it to zero. The hardware TPU performance counter register records the number of packets successfully received at each channel of each port of the TPU. The profiling traffic is injected into the TPU communications network and the number of packets successfully received at each port of the TPU is counted by the hardware register (404). A separate software system reads (e.g., via an API) the counter register and determines a total value of received packets for each port (and channel) during the profiling run. In some implementations, the profiling run is significantly shorter than the actual training run to be executed. For example, the profiling run can be on the order of minutes or hours, while the training job can take days or weeks.

Once the profiling run is complete, the number of received packets at each channel of each port can be used to determine a queue size for that port (406). In some implementations the queue size is determined using the following equation, where p is a port, Nis the total number of ports on the ASIC, and packet_num is the number of packets received during the profiling run. It should be noted that the following equation yields a value of zero for an unused port, and therefore the unused port will be allocated a queue size of zero.

$$\text{Queue Size}(p) = \frac{packet\_num_p}{(N-1)*\sum packet\_num_i} * \text{Total Size}$$

Once a queue size for each port and channel is determined, a start address and end address of the shared memory can be assigned for each port according to the size allocation (310). In some implementations this is accomplished using one or more APIs provided by the TPU architecture. For example, the APIs can write to the PCIe config space registers that specify the size of each buffer queue. The APIs convert the queue sizes to each queue's start and ending address for hardware operation. The disclosed solution can invoke these APIs to dynamically configure and allocate the queue sizes for all ports in the TPU communication network.

Upon completion of assigning addresses to the shared memory, the TPU communication network can be enabled, and an inference process, or training run can begin (312). The inference process can be a long running process intended to train, or weight a neural network for future machine learning outputs.

The profile-guided queue adjustment can reflect the packet retransmit caused by bad link quality, unbalanced link traffic caused by the routing algorithm or faulty chips/links. Hence, it can be a more optimal scheme that allocates more credits for ports/links that undergo more traffic and require more buffer space for forwarding messages from one port to the other.

Figure 5:
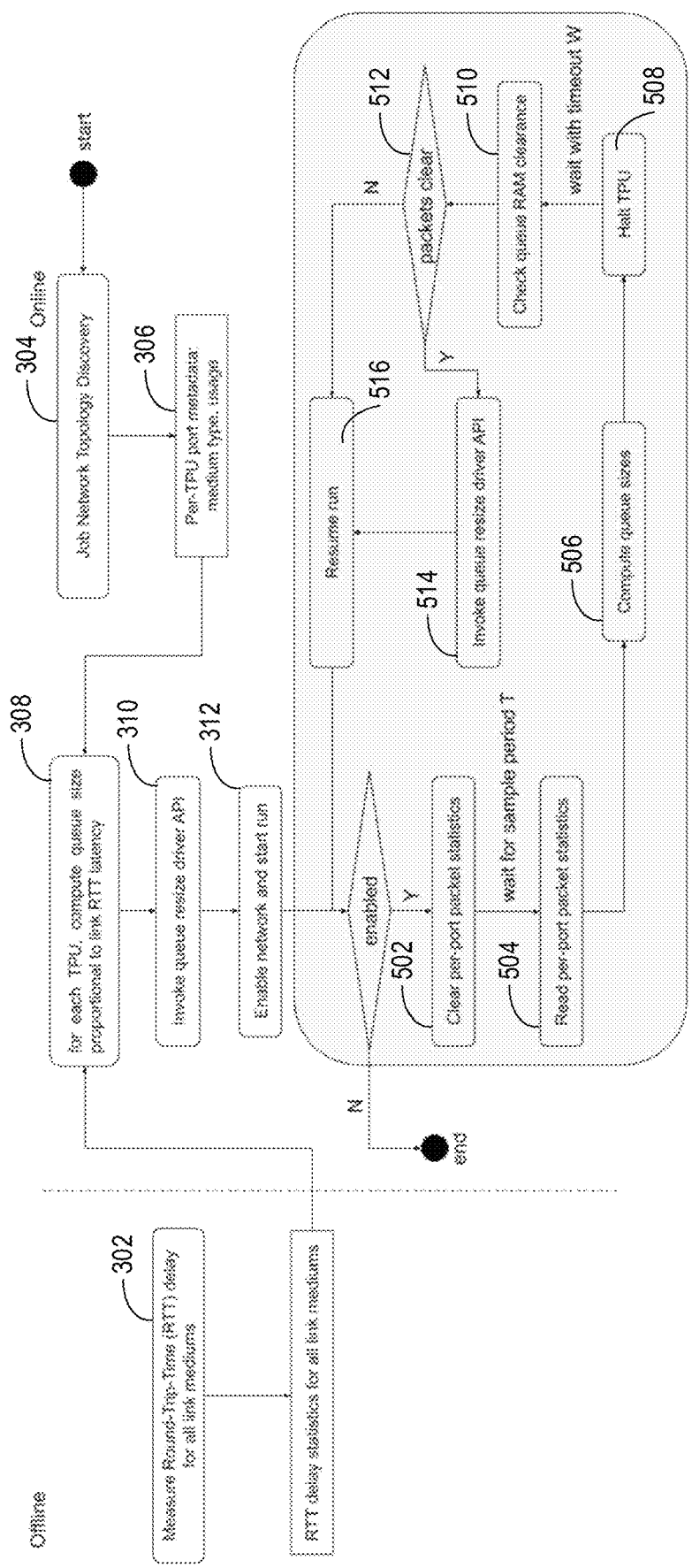
FIG. 5 is a flowchart of an example process for allocating shared memory based on a traffic during an execution in accordance with implementations of the present disclosure.

FIG. 5 is a flowchart of an example process for allocating shared memory based on a traffic during an execution in accordance with implementations of the present disclosure. The process described in FIG. 5 can begin similarly to the processes of FIG. 4 and FIG. 3 (e.g. 302 through 312). In some implementations, some or all of the processes occur sequentially. For example, the system can initially allocate memory based on the predicted latency as described with respect to FIG. 3, then execute a profiling run and reallocate memory based on the profiling run as described with respect to FIG. 4, and finally, during execution of a training run, further reallocate memory according to the process described below with reference to FIG. 5. Any suitable combination of these processes is contemplated by this disclosure.

Once an initial queue allocation is achieved (either via the process described in FIG. 3, or FIG. 4, or both) a training job can begin execution. During execution, a controller can monitor the packet count for each port as recorded by the hardware TPU performance counter registers as described above. Initially, per-port packet statistics and hardware counters can be cleared at the beginning of the run (502). The training job can execute for a predetermined amount of time, and then the queues can be adjusted based on the packet count for each port during job execution. In some implementations, the message queues are reallocated periodically during execution, or a set number of times (e.g., once every hour for the first five hours of execution). In some implementations, the message queues are reallocated more frequently during the beginning of the training job, with less frequency as execution proceeds (e.g., every 10 minutes for the first hour, then every hour for the next five hours, then once per day afterward). In some implementations, the period is configured by the user on a case by case basis.

When the predetermined time has expired and the queues are to be reallocated, the packet statistics for each port are read from the hardware TPU performance counter registers (504). The desired queue sizes are computed (506). In some implementations the desired queue size is computed using the equation as described with reference to FIG. 4.

When the queue sizes are determined, the training job execution can be paused, allowing the TPUs to fully ingest and process any pending message traffic and clear their queues (508). In some implementations the controller verifies queues are clear (e.g., the shared RAM has no pending messages for each TPU) prior to proceeding (510). In some instances, the pause lasts a predetermined amount of time, and if the shared RAM is not clear (512), the training job execution resumes (516). In these instances, the controller may re-attempt reallocation at a later time. If it is determined that the shared RAM is clear, the queues in the shared RAM are each assigned new start and stop addresses (e.g., via an API as discussed above) (514). The controller can then clear the per-port packet statistics stored in the hardware TPU performance counter registers and the training job then resumes execution (502). This process can repeat as necessary during the training job execution.

Figure 6:
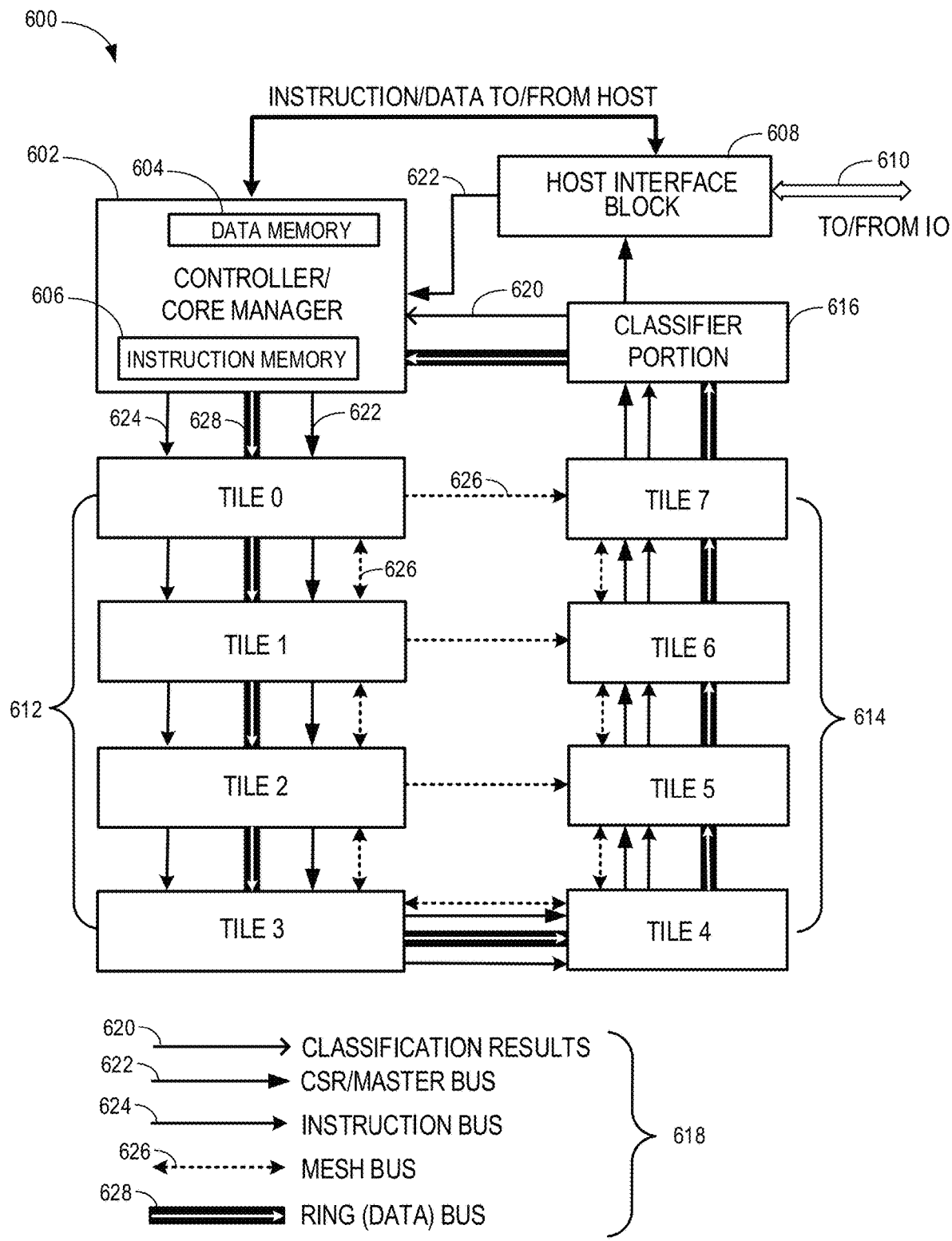
FIG. 6 is a schematic diagram that illustrates an example of a special purpose logic chip that can be used in the multi-chip system of FIG. 1.

FIG. 6 is a schematic that illustrates an example of a special purpose logic chip that can be used in the machine learning accelerator of FIG. 1. FIG. 6 shows a block diagram of an ASIC used in a machine learning hardware accelerator as an example computing system 600 for accelerating tensor computations associated with deep neural networks (DNNs). The system 600 can be, for example, the ASIC 102 as described with reference to FIG. 1. The system 600 generally includes a controller 602, a host interface 608, an input/output (I/O) link 610, multiple tiles including a first tile set 612 and a second tile set 614, a classifier portion 616, and data buses identified in a bus map 618 (which is shown for clarity, but is not included in the system 600). Controller 602 generally includes data memory 604, instruction memory 606, and at least one processor configured to execute one or more instructions encoded in a computer readable storage medium. Instruction memory 606 may store one or more machine readable instructions that are executable by the one or more processors of controller 602. Data memory 604 may be any of a variety of data storage mediums for storing and subsequently accessing a variety of data relating to computations that occur within system 600.

Controller 602 is configured to execute one or more instructions relating to tensor computations within system 600, including instructions stored in instruction memory 606. In some implementations, data memory 604 and instruction memory 606 are volatile memory unit or units. In some other implementations, data memory 604 and instruction memory 606 are non-volatile memory unit or units. Data memory 604 and instruction memory 606 may also be another form of computer-readable medium, such as a floppy disk device, a hard disk device, an optical disk device, or a tape device, a flash memory or other similar solid state memory device, or an array of devices, including devices in a storage area network or other configurations. In various implementations, controller 602 may also be referenced or referred to as core manager 602.

As depicted, host interface 608 is coupled to I/O link 610, controller 602, and classifier portion 616. Host interface 608 receives instructions and data parameters from I/O link 610 and provides instructions and parameters to controller 602. In general, instructions can be provided to one or more devices in system 600 through instruction bus 624 (described below) and parameters can be provided to one or more devices in system 600 through ring bus 628 (described below). In some implementations, instructions are received by controller 602 from host interface 618 at an initial time and stored in instruction memory 606 for execution by controller 602 at a later time.

Classifier portion 616 is likewise coupled to controller 602 and tile 7 of second tile set 614. In some implementations, classifier portion 616 is implemented as a separate tile within the system 600. In alternative implementations, classifier portion 616 is disposed or located within controller 602 as a sub-circuit or sub-device of controller 602. Classifier portion 616 is generally configured to perform one or more functions on accumulated pre-activation values that are received as outputs of fully connected layers. Fully connected layers may be partitioned across the tiles in tile sets 612 and 614. Thus, each tile is configured to produce a subset of pre-activation values (i.e., linear outputs) which may be stored in a memory unit(s) of the tile. Classification results bus 620 provides a data path from classifier portion 616 to controller 602. Data that includes post-function values (i.e., results) are provided to controller 602 from classifier portion 616 via classification results bus 620.

Bus map 618 shows data buses that provide one or more inter-connected data communication paths between tiles of first tile set 612 and second tile set 614. Bus map 618 provides a legend for identifying a classification results bus 620, CSR/master bus 622, instruction bus 624, mesh bus 626, and ring bus 628 as depicted in FIG. 6. In general, a tile is a core component within the accelerator architecture of system 600 and is the focal point for tensor computations that occur in the system. Each tile is an individual computing unit that cooperates with other tiles in the system to accelerate computations across one or more layers of a multi-layer neural network. Although tiles in tile sets 612, 614 can share execution of tensor computations associated with a given instruction, an individual computing unit is a self-contained computational component configured to execute a subset of tensor computations independently relative other corresponding tiles within tile sets 612, 614.

CSR bus 622 is a single master multiple slave bus that enables controller 602 to transmit one or more instructions that set program configurations and read status registers associated with one or more tiles. CSR bus 622 may be connected in a single daisy chain configuration with one master bus segment and multiple slave bus segments. As shown in FIG. 6, CSR bus 622 provides communications coupling through a bus data path that connects tiles in tile sets 612, 614 and controller 602 in a ring to host interface 610. In some implementation, host interface 610 is the single master of the CSR bus ring and the entire CSR bus address space is memory mapped to a memory space in host interface 610.

CSR bus 622 may be used by host interface 610 to perform one or more operations including, for example, programming memory buffer pointers in controller 602 to enable controller 602 to begin fetching instructions from instruction memory 606, updating/programming various tile settings (e.g., coefficient tables for polynomial approximation calculations) that remain static during one or more computations, and/or loading/reloading firmware to classification portion 616. In one example, firmware reloads may include new functions to be applied to linear outputs (i.e., pre-activation values). Accordingly, every slave having access to CSR bus 622 will have a distinct node identifier (node ID) that is tied to the slave and identifies it. The node ID will be part of an instruction address and will be used, inspected or otherwise examined by the CSR slaves (i.e., controller 602, tiles 612, 614 and classifier 616) to determine whether the CSR packet is addressed to the slave.

In some implementations, one or more instructions can be transmitted by host interface 602 through controller 602. The instructions may, for example, be 32-bits wide with the first 7-bits including header information indicating the instruction address/destination that is to receive and execute the instructions. The first 7-bits of the header may contain data parameters that represent a particular node ID. Slaves (e.g., each tile) on the CSR bus ring may therefore inspect the header of the instruction to determine if the request by the master (host interface 610) was addressed to the tile inspecting the header. If the node ID of the header does not indicate that the destination is the inspecting tile, the inspecting tile will copy the input CSR instruction packet to the CSR bus input connected to the next tile for inspection by the next tile.

Instruction bus 624 originates from controller 602 and, similar to CSR bus 622, also provides communications coupling through a bus data path that connects tiles in tile sets 612, 614 in a ring back to controller 602. In one implementation, controller 602 broadcasts one or more instructions via instruction bus 624. The instructions that are broadcast by controller 602 may differ from the instructions provided via CSR bus 622. However, the manner in which a tile receives and/or consumes or executes the instruction received via bus 624 may be similar to the process for executing instructions received via CSR bus 622.

In one example, a header (i.e., a bitmap) of the instruction indicates, to a receiving tile, that the receiving tile needs to consume a particular instruction based on a bitmap associated with the instruction. The bitmap may have a particular width defined in terms of bits. The instruction is typically forwarded from one tile onto the next tile based on parameters of the instruction. In one implementation, the width of instruction bus 624 may be configured to be smaller than the size/width of the instruction. Thus, in such a configuration, transmission of the instructions will be over several cycles and bus stops of instruction bus 624 will have decoders to place instructions received at the tile in the appropriate target instruction buffer associated with that tile.

As described further below, the tiles in tile sets 612, 614 are generally configured to support two broad categories of instructions. The two broad categories may also be referred to as instruction types. The instruction types include a tensor operation (TensorOp) instruction and a direct memory access (DMAOp) instruction. In some implementations, DMAOp instructions have one or more specializations that are allowed to be concurrent. The one or more specializations may be referred to as DMAOp instruction subtypes or opcodes. In some cases, every unique and/or valid DMAOp instruction type/subtype tuple will have a separate instruction buffer within a particular tile.

At a particular tile of tiles 612, 614, the bus stop associated with instruction bus 624 will examine the header bitmap to determine the instruction type/subtype. The instruction may be received by the tile and subsequently written to an instruction buffer of the tile prior to execution of the instruction by the tile. The instruction buffer of the tile in which the instruction is written to may be determined by the type and subtype indicator/field of the instruction. The instruction buffers may include a first-in first-out (FIFO) control scheme that prioritizes consumption of one or more related instructions. Thus, under this FIFO control scheme, instructions of the same type/subtype will always be executed in the order in which the instruction arrived on the instruction bus.

The different instruction buffers within a tile are the TensorOp instruction buffers and the DMAOp instruction buffers. As indicated above, instruction types include the TensorOp instruction and the DMAOp instruction. With regard to DMAOp instructions, instruction subtypes (indicating a 'write-to' buffer location) include the following: 1) mesh inbound instruction buffer; 2) mesh outbound instruction buffer; 3) narrow-wide DMA instruction buffer; 4) wide-narrow DMA instruction buffer; and 5) ring bus DMA instruction buffer. These buffer locations will be described in more detail below with reference to FIG. 7. Wide and narrow designations are used throughout the specification and generally refer to an approximate size in width (bits/bytes) of one or more memory units. As used herein, "narrow" may refer to one or more memory units each having a size or width of less than 16-bits and "wide" may refer to one or more memory units each having a size or width or less than 64-bits.

Mesh bus 626 provides a data communications path that is distinct from CSR bus 622, instruction bus 624, and ring bus 628 (described below). As depicted in FIG. 6, mesh bus 626 provides a communications path that couples or connects each tile to its corresponding neighbor tile in both the X and Y dimensions. In various implementations, mesh bus 626 may be used to transport input activation quantities between one or more narrow memory units in adjacent tiles. As shown, mesh bus 626 does not allow direct forwarding of input activation data to non-adjacent tiles.

In various implementations, mesh bus 626 and the various tiles connected via mesh bus 626 may have the following configuration. Four corner tiles of the mesh have two outbound ports and two inbound ports. Four edge tiles of the mesh have three inbound ports and three outbound ports. All non-edge, non-corner tiles have four inbound ports and four outbound ports. In general, given an example N×N tile layout, edge tiles are tiles with only three neighbor tiles while corner tiles are tiles with two neighbor tiles. Regarding data flow methodology via mesh bus 626, in general, every input activation that arrives via mesh bus 626 for a particular tile must be committed to one or more narrow memory units of the tile. Moreover, for tile configurations that have fewer than four inbound ports, DMAOp instructions may write zero values to the locations in the tile's narrow memory instead of waiting for data on an absent input port. Likewise, for tile configurations that have fewer than four outbound ports, DMAOp instructions will not execute the narrow memory reads and port writes related to transfers for any absent ports.

In some implementations, a location or address of a narrow memory unit(s) that a particular input activation will be written to, or read from, will be generated by a Tensor Traversal Unit (hereinafter "TTU") based on inbound/outbound DMAOp provided via mesh bus 626. An inbound DMAOp and an outbound DMAOp may be executed concurrently and any required synchronization will be managed through sync flag control schemes administered by controller 602. TTUs are described in further detail below with reference to FIG. 7.

Ring bus 628 originates from controller 602 and, similar to CSR bus 622 and instruction bus 624, also provides communications coupling through a bus data path that connects tiles 612, 614 in a ring back to controller 602. In various implementations, ring bus 628 generally connects or couples all wide memory units (described in more detail below with reference to FIG. 7) in all tiles 612, 614. Thus, a payload width of ring bus 628 corresponds to the width of the wide memory units disposed within each tile of tile sets 612, 614. As discussed above, ring bus 628 also includes a bitmap header indicating the tiles that need to consume payload data comprising instructions or parameters communicated via ring bus 628.

With regard to data (i.e., payload) received at a particular tile via ring bus 628, in response to receiving the information, each tile will zero (i.e., clear out) position data indicated in the bitmap header that is unique to the receiving tile before forwarding the data on to another tile. Hence, when the header bitmap has no remaining bit set data indicating a particular tile that is to receive the payload, forwarding of the payload to another tile will stop. Payload data generally refers to activations and weights used by one or more tiles during tensor computations performed based on execution of deeply nested loops.

In some implementations, controller 602 may be described as being a part of ring bus 628. In one example, for DMAOp instructions executed within a particular tile, controller 602 may be used to pop the data/payload from ring bus stops and forward the payload to a ring bus stop in a next tile in the ring. Controller 602 may also cause the payload data to be committed to one or more wide memory units of the tile if such action is required by instructions in the bitmap header. The address of the one or more wide memory units to which the data needs to be written may be generated by DMAOp instructions within the particular tile.

In various implementations, each tile of tile set 612, 614 can either be a producer of payload data or a consumer of payload data. When a tile is a producer of payload data the tile reads the data from one or more of its wide memory units and multicasts the data over ring bus 628 for consumption by one or more other tiles. When a tile is a consumer of payload data the tile receives and writes the data to one or more wide memory units within the tile and forwards the payload data for consumption by one or more other tiles. With regard to movement of payload data via ring bus 628, there typically will only be one producer/master of data on ring bus 628 at any given time. The DMAOp instruction execution order (e.g., FIFO control scheme) in all tiles will ensure there is only one producer/master of data on ring bus 628 at a given time.

In some implementations, controller 602 uses a sync flag control architecture to ensure there is only one producer/master of payload data on ring bus 628 at a given time. In one example, every write by a tile to a ring output will trigger an increment of the corresponding sync flag count. Controller 602 may examine the payload data to determine the number of data chunks or segments that comprise the payload. Controller 602 then monitors execution by the tile to ensure the expected number of data segments are forwarded and/or consumed by the tile before another tile executes in master mode.

An exception to ensuring there is only one producer/master of data on ring bus 628 at a given time occurs when there are local multicast groups connected via ring bus 628 that do not have an overlapping region on the ring bus. For example, tile 0 (master) may multicast (i.e., produce data) to a tile in Tile 0-Tile 3 grouping, while Tile 4 (master) may do the same to a tile in Tile 4-Tile 7 grouping. An important requirement of this dual master multicast methodology is that different multicast groups must not be allowed to see each other's data packets because packet overlap may occur and lead to one or more data computation errors.

As shown in FIG. 6, controller 602 provides a communications data path that couples or connects tiles in tile sets 612, 614 to I/O 610 and includes several core functions. The core functions of controller 602 generally include feeding one or more I/O input activations to tiles in tile sets 612, 614 feeding one or more input activations and parameters received from I/O 610 to the tiles, feeding one or more instructions received from I/O 610 to the tiles, sending I/O output activations to host interface 608, and serving as a ring stop for CSR bus 622 as well as ring bus 628. As described in more detail below, first tile set 612 and second tile set 614 each include multiple tiles that are used to perform one or more tensor computations that are executed based on a deep loop nest comprised of inner and outer loops.

System 600 generally operates as follows. Host interface 608 will provide one or more instructions to controller 602 that define direct memory access operations (DMAOp) that occur for a given computation. Descriptors associated with instructions fed to controller 602 will include information required by the controller to facilitate large scale dot product computations associated with multi-dimensional data arrays (tensors). In general, controller 602 receives, from host interface 608, input activations, tile instructions, and model parameters (i.e., weights) for executing tensor computations for a given layer of a neural network. Controller 602 may then cause the instructions to be multicast to tiles 612, 614 in a data flow manner defined by the instruction(s). As discussed above, tiles consuming an instruction may then initiate a broadcast of a new/subsequent instruction to another tile based on bitmap data in the instruction header.

With regard to data flow, input activations and parameters are transmitted to tiles of tile sets 612, 614 via ring bus 628. Each of tiles 612, 614 will store a subset of the input activations needed to compute a subset of output activations that are assigned to that particular tile. DMAOp instructions for a tile will cause the input activation to be moved from wide memory to narrow memory. Computation within a tile begins when required input activations, parameters/weights and computation instructions (TTU operations, memory addresses, etc.) are available in the tile. Computations occurring within a tile ends when MAC operators (described below) within a tile complete all dot product operations defined by the instruction set and pre-activation functions are applied to the results (i.e., output activations) of the multiplication operations.

Results of the one or more tensor computations include writing output activations of a compute layer to a narrow memory unit(s) of the tile performing the computation. For certain tensor computations, there will be a transfer of output edge activations to neighboring tiles via mesh bus 626. Transfer of output edge activations to neighboring tiles are required to compute output activations for a subsequent layer when computations span multiple layers. When computations for all layers are complete, a DMAOp will move final activations to classifier tile 616 through ring bus 628. Controller 602 will then read final activations from classifier tile 616 and execute a DMAOp to move the final activations to host interface 608. In some implementations, classifier portion 616 performs computations of an output layer (i.e., the last layer) of the NN. In other implementations, the output layer of the NN is one of classifier layer, a regression layer, or another layer type that is generally associated with neural networks.

Figure 7:
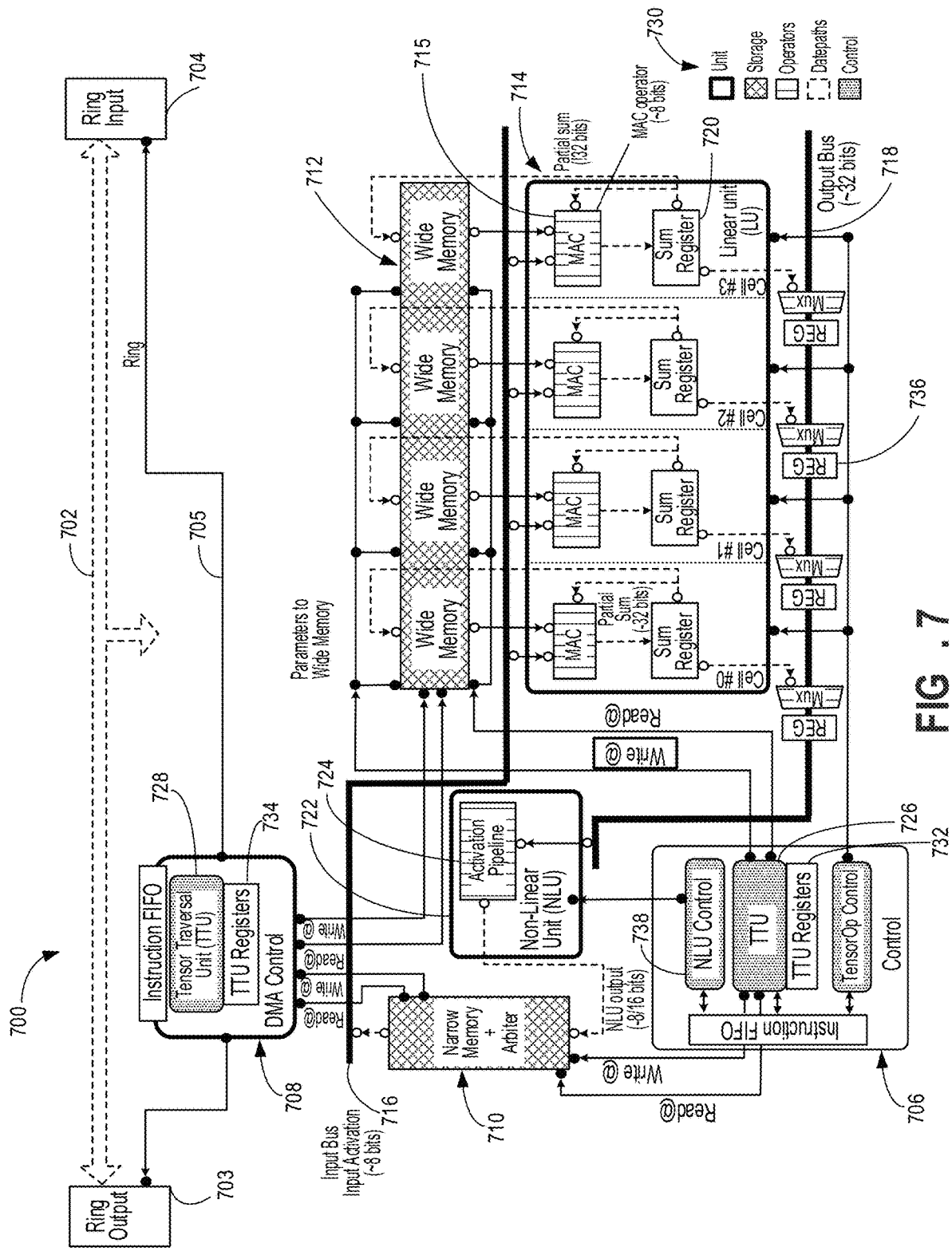
FIG. 7 illustrates an example neural network (NN) compute tile 700 which could be used in an ASIC.

FIG. 7 illustrates an example neural network (NN) compute tile 700 which could be used in an ASIC (e.g. TPU 106) as described with reference to FIG. 1. Generally, the example tile 700 may correspond to any of the tiles within first tile set 612 and second tile set 614 discussed above with reference to FIG. 6. In various implementations, compute tile 700 may also be referenced or referred to as computing unit 700. Each compute tile 700 is a self-contained computational unit configured to execute instructions independently relative other corresponding tiles within tile sets 612, 614. As discussed briefly above, each compute tile 700 executes two types of instructions, a TensorOp instruction and a DMAOp instruction. In general, each instruction type will include compute operations associated with deep loop nests and thus each instruction type will generally execute over multiple time epochs to ensure completion of all loop iterations.

As discussed in more detail below, the different instruction types are executed by independent control units within compute tile 700 that synchronize on data through sync flag controls that are managed within compute tile 700. The sync flag controls manage concurrency between executions of different instruction types within compute tile 700. Each compute operation associated with each instruction type will be executed in strict order of issuance (i.e., First-In First-Out). With regard to the two instruction types, TensorOP and DMAOp, there are no ordering guarantees between these different instruction types and each type is treated by compute tile 700 as a separate thread of control.

With regard to data flow constructs, compute tile 700 generally includes data path 702 and data path 705 that each provide a communications path for data flow into and out of compute tile 700. As described above, system 600 includes three distinct data bus structures that are laid out in a ring configuration—CSR bus 622, instruction bus 624, and ring bus 628. Referring to FIG. 7, data path 705 corresponds to instruction bus 624, while data path 702 generally corresponds to one of CSR bus 622 and ring bus 628. As shown, data path 702 includes a ring output 703 providing an output path for data leaving compute tile 700 and a ring input 704 providing an input path for data entering compute tile 700.

Compute tile 700 further includes a TensorOp control 706 including a TensorOp tensor traversal unit (TTU) 726 and a DMAOp control 708 including a DMAOp TTU 728. TensorOp control 706 generally manages writes to and reads from TensorOp TTU register 732 and administers traversal operations for execution by TensorOp TTU 726. Likewise, DMAOp control 708 generally manages writes to and reads from DMAOp TTU register 734 and administers traversal operations for execution by DMAOp TTU 728. TTU register 732 includes instruction buffers for storing one or more instructions comprising operations to be performed by TensorOp TTU 726 upon execution of the instructions by TensorOp control 706. Likewise, TTU register 734 includes instruction buffers for storing one or more instructions comprising operations to be performed by TTU 708 upon execution of the instructions by DMAOp control 708. As described further below, TTUs are used by compute tile 700 to traverse array elements of one or more tensors that generally reside in narrow memory 710 and wide memory 712.

In some implementations, certain instructions for execution by compute tile 700 arrive at the tile via data path 705 (i.e., a portion of instruction bus 624). Compute tile 700 will examine the header bitmap to determine the instruction type (TensorOp or DMAOp) and the instruction subtype (read operation or write operation). Instruction(s) received by compute tile 700 are subsequently written to a particular instruction buffer depending on the instruction type. In general, instructions are received and stored (i.e., written to the buffer) prior to execution of the instruction by a component of compute tile 700. As shown in FIG. 7, the instruction buffers (i.e., TensorOp TTU register 732 and DMAOp TTU register 734) may each include a first-in first-out (FIFO) control scheme that prioritizes consumption (execution) of one or more related instructions.

As discussed briefly above, a tensor is a multi-dimensional geometric object and example multi-dimensional geometric objects include matrices and data arrays. An algorithm, including deeply nested loops, may be executed by compute tile 700 to perform tensor computations by iterating one or more nested loops to traverse an N-dimensional tensor. In one example computational process, each loop of the loop nest may be responsible for traversing a particular dimension of the N-dimensional tensor. As described herein, TensorOp control 706 generally administers one or more tensor operations that drive the sequence in which dimensional elements of a particular tensor construct are traversed and accessed to complete computations defined by the deep nested loops.

Compute tile 700 further includes a narrow memory 710 and a wide memory 712. Narrow and wide designations generally refer to a size in width (bits/bytes) of the memory units of narrow memory 710 and wide memory 712. In some implementations, narrow memory 710 includes memory units each having a size or width of less than 16-bits and wide memory 712 includes memory units each having a size or width or less than 32-bits. Generally, compute tile 700 receives input activations via data path 705 and DMA control 708 executes an operation to write the input activations into narrow memory 710. Likewise, compute tile 700 receives parameters (weights) via data path 702 and DMA control 708 executes an operation to write the parameters into wide memory 712. In some implementations, narrow memory 710 can include a memory arbiter typically used in shared memory systems to decide, for each memory cycle, which control device (e.g., TensorOp control 706 or DMAOp control 708) will be allowed to access that shared memory units of narrow memory 710.

Compute tile 700 further includes an input activation bus 716 and a MAC array 714 including multiple cells that each include a MAC operator 715 and a sum register 720. In general, MAC array 714 executes, using MAC operators 715 and sum registers 720 across multiple cells, tensor computations that include arithmetic operations relating to dot product computations. Input activation bus 716 provides a data path in which input activations are provided, by narrow memory 710, one-by-one for respective access by each MAC operator 715 of MAC array 714. Hence, based on the one-by-one broadcast of an input activation, a single MAC operator 715 of a particular cell will each receive an input activation. Arithmetic operations performed by the MAC operators of the MAC array 714 generally include multiplying an input activation provided by narrow memory 710 with a parameter accessed from wide memory 712 to produce a single output activation value.

During arithmetic operations, partial sums may be accumulated and stored in a corresponding, e.g., sum register 720, or written to wide memory 712 and re-accessed by a particular cell of MAC array 714 to complete follow-on multiply operations. The tensor computations can be described as having a first portion and second portion. The first portion is complete when multiply operations produce an output activation, for example, by completing a multiplication of an input activation and a parameter to generate the output activation. The second portion includes application of a non-linear function to an output activation and the second portion is complete when the output activation is written to narrow memory 710 after application of the function.

Compute tile 700 further includes an output activation bus 718, a non-linear unit (NLU) 722 comprising an output activation pipeline 724, an NLU control 738, and a reference map 730 that indicates a core attribute of a component in compute tile 700. Reference map 730 is shown for clarity, but is not included in the compute tile 700. Core attributes include whether a particular component is a unit, a storage device, an operator, a control device or a data path. In general, upon completion of the first portion of the tensor computations, output activations are provided from MAC array 714 to NLU 722 via output activation bus 718. After arrival at NLU 722, data specifying an activation function, received via activation pipeline 724 is applied to the output activations and the output activations are then written to narrow memory 710. In some implementations, output activation bus 718 includes at least one pipelined shift register 736 and completing the second portion of the tensor computations includes using a shift register 736 of activation bus 718 to shift output activations toward narrow memory 710.

With regard to dot product computations of, for example, two multi-dimensional data arrays, for a single compute tile 700, MAC array 714 provides robust single instruction multiple data (SIMD) functionality. SIMD generally means that all parallel units (multiple MAC operators 715) share the same instruction (based on the deep loop nest), but each MAC operator 715 executes the instruction on different data elements. In one basic example, adding the arrays [1,2,3,4] and [5,6,7,8] element-wise to obtain the array [6,8,10,12] in one cycle will typically require four arithmetic units to execute the operation on each element. By using SIMD, the four units can share the same instruction (e.g., "add") and perform computations in parallel. Thus, system 600 and compute tile 700 provides enhanced acceleration and parallelism in tensor computations over prior methods.

In one example, and as described in more detail below, a single instruction can be provided by controller 602 to multiple compute tiles 700 (see tile sets 612, 614 of FIG. 6) for consumption by multiple MAC arrays 714. In general, neural network layers can include multiple output neurons and the output neurons can be partitioned such that tensor computations associated with a subset of output neurons can be assigned to a particular tile of tile sets 612, 614. Each tile of tile sets 612, 614 can then perform related tensor computations on different groups of neurons for a given layer. Compute tile 700 can therefore provide at least two forms of parallelism: 1) one form includes partitioning the output activations (corresponding to the subset of output neurons) amongst the multiple tiles of tile set 612, 614; and 2) another form includes simultaneous computation (with a single instruction) of multiple subsets of output neurons based on the partitioning amongst the tiles of tile sets 612, 614.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

Particular embodiments of the subject matter have been described. Other embodiments are within the scope of the following claims. For example, although bus lines are described as "controllable," not all bus lines need to have the same level of control. For instance, there can be varying degrees of controllability, where some bus lines can be controlled only where some bus lines are restricted in terms of the number of tiles from which they can source data or to which they can send data. In an another example, some bus lines may be dedicated to providing data along a single direction, such as north, east, west, or south as described herein. In some cases, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Embodiments of the subject matter and the functional operations described in this specification can be implemented in digital electronic circuitry, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a GPGPU (general purpose graphics processing unit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Further to the descriptions above, a user may be provided with controls allowing the user to make an election as to both if and when systems, programs, or features described herein may enable collection of user information. In addition, certain data may be treated in one or more ways before it is stored or used, so that personally identifiable information is removed. For example, a user's identity may be treated so that no personally identifiable information can be determined for the user, or a user's skin data and/or diagnosis cannot be identified as being associated with the user. Thus, the user may have control over what information is collected about the user and how that information is used Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented memory allocation method for a machine learning accelerator communication network, the method comprising:
    accessing metadata associated with a plurality of communications ports of an application specific integrated circuit (ASIC), wherein the metadata identifies, for each communications port of the plurality of communications ports, whether a respective communications port is used in a current configuration and a communications medium associated with the respective communications port;
    determining an expected latency for each communications port of the plurality of communications ports based on the accessed metadata;

allocating portions of a shared memory to each communications port of the plurality of communications ports by:
assigning a zero memory for communications ports that are not used;
determining a memory allocation for each communications port based on the expected latency; and
assigning a start address and a stop address of the shared memory to each communications port, wherein assigning the start address and the stop address of the shared memory to each communications port comprises invoking, by a different device from the ASIC, an application programming interface (API).

2. The method of claim 1, comprising executing a process on the ASIC, the process using the machine learning accelerator communications network and the allocated shared memory.

3. The method of claim 2, wherein the process comprises training a neural network.

4. The method of claim 1, wherein the ASIC is a Tensor Processing unit (TPU).

5. The method of claim 1, wherein the communications medium identified in the metadata includes at least one of:
a copper cable medium;
an optical medium; or
a printed circuit board (PCB) medium.

6. The method of claim 1, wherein memory allocation is determined based on $$\text{Queue Size}(p) = \frac{latency_p}{(N-1) * \sum latency_i} * \text{Total Size}.$$

7. A computer-implemented memory allocation method for a machine learning accelerator communication network, the method comprising:
determining a network topology for a network of machine learning accelerator application specific integrated circuits (ASICs);
accessing metadata associated with a plurality of communications ports of each ASIC within the network, wherein the metadata identifies, for each communications port of the plurality of communications ports, whether a respective communications port is used in a current configuration and a communications medium associated with the respective communications port;
determining, for each used communications port in the network topology a round-trip-time (RTT) delay;
allocating portions of a shared memory to each communications port of the plurality of communications ports by:
determining a memory allocation for each communications port proportional to the RTT delay; and
assigning a start address and a stop address of the shared memory to each communications port for the determined memory allocation;
executing a process on the machine learning accelerator to send profiling traffic into the network for a predetermined duration;
determining, for each communications port, a number of received traffic packets; and
reallocating portions of the shared memory to each communications port of the plurality of communications ports by:
determining a memory allocation for each communications port proportional to the number of received traffic packets; and
reassigning the start address and the stop address of the shared memory for each communications port for the determined memory allocation.

8. The method of claim 7, wherein assigning and reassigning the start address and the stop address of the shared memory to each communications port comprises invoking, by a different device from the ASIC, an application programming interface (API).

9. The method of claim 7, comprising executing a process on the ASIC, the process using the machine learning accelerator communications network and the allocated shared memory.

10. The method of claim 9, wherein the process comprises training a neural network.

11. The method of claim 7, wherein the ASIC is a Tensor Processing unit (TPU).

12. The method of claim 7, wherein memory allocation proportional to the determined RTT delay is determined based on $$\text{Queue Size}(p) = \frac{latency_p}{(N-1) * \sum latency_i} * \text{Total Size}.$$

13. The method of claim 7, wherein memory allocation for each communications port proportional to the number of received packets is determined based on $$\text{Queue Size}(p) = \frac{packet\_num_p}{(N-1) * \sum packet\_num_i} * \text{Total Size}.$$

14. The method of claim 7, wherein RTT delay is calculated prior to execution by transmitting and receiving one or more timing messages to determine latency.

15. The method of claim 7, wherein the profiling traffic is at least one of:
all-to-all traffic;
nearest-neighbor traffic; or
a synthetic traffic profile.

16. A computer-implemented memory allocation method for a machine learning accelerator communication network, the method comprising:
determining a network topology for a network of machine learning accelerator application specific integrated circuits (ASICs);
accessing metadata associated with a plurality of communications ports of each ASIC, wherein the metadata identifies, for each communications port of the plurality of communications ports, whether a respective communications port is used in a current configuration and a communications medium associated with the respective communications port;
determining, for each used communications port in the network topology a round-trip-time (RTT) delay;
allocating portions of a shared memory to each communications port of the plurality of communications ports by:
determining a memory allocation for each communications port proportional to the RTT delay; and
assigning a start address and a stop address of the shared memory to each communications port for the determined memory allocation;

executing a process on the ASIC, the process using the machine learning accelerator communications network with the allocated shared memory; and during execution of the process:
determining a number of message packets received at each communications port of the plurality of communications ports over a first time period;
determining, based on the number of message packets received at each communications port, a desired portion size of the shared memory for each communications port of the plurality of communications ports;
pausing the process for a second time period;
determining that the shared memory is clear of pending message packets;
reassigning the start address and the stop address of the shared memory for each communications port for the desired portion size; and
resuming execution of the process.

17. The method of claim 16, wherein assigning and reassigning the start address and the stop address of the shared memory to each communications port comprises invoking, by a different device from the ASIC, an application programming interface (API).

18. The method of claim 16, wherein the ASIC is a tensor processing unit (TPU).

19. The method of claim 16, wherein the process comprises training a neural network.

* * * * *